United States Patent [19]
Swan et al.

[11] Patent Number: 5,982,536
[45] Date of Patent: Nov. 9, 1999

[54] DISPLAY SYSTEM

[75] Inventors: Gordon Swan; Herbert Morrison Runciman, both of Glasgow; Hillary Sillito, West Lothian, all of United Kingdom

[73] Assignee: Barr & Stroud Limited, Glasgow, United Kingdom

[21] Appl. No.: 09/051,812

[22] PCT Filed: Oct. 16, 1996

[86] PCT No.: PCT/GB96/02521

§ 371 Date: Jun. 4, 1998

§ 102(e) Date: Jun. 4, 1998

[87] PCT Pub. No.: WO97/14985

PCT Pub. Date: Apr. 24, 1997

[30] Foreign Application Priority Data

Oct. 17, 1995 [GB] United Kingdom ............. 9521210

[51] Int. Cl.⁶ ................. G02B 23/08; G02B 23/30
[52] U.S. Cl. ................. 359/400; 359/403; 345/1
[58] Field of Search ................. 359/403, 419, 359/401, 350, 351, 353, 19, 400; 345/1, 903; 434/29

[56] References Cited

U.S. PATENT DOCUMENTS

| | | | |
|---|---|---|---|
| 749,754 | 1/1904 | Spear | 359/403 |
| 1,708,746 | 4/1929 | Van Hofe | 359/403 |
| 3,229,576 | 1/1966 | Rees . | |
| 3,505,465 | 4/1970 | Rees . | |
| 5,009,502 | 4/1991 | Shih et al. | 356/152.1 |
| 5,204,489 | 4/1993 | Pellarin et al. | 359/403 |
| 5,255,030 | 10/1993 | Mukai et al. | 396/20 |

FOREIGN PATENT DOCUMENTS

| | | |
|---|---|---|
| 0 072 958 | 3/1983 | European Pat. Off. . |
| 2 258 818 | 6/1987 | European Pat. Off. . |
| 3 024 330 | 1/1982 | Germany . |
| 2 197 810 | 8/1990 | Japan . |
| 2 162 016 | 1/1986 | United Kingdom . |
| 87/04803 | 8/1987 | WIPO . |

*Primary Examiner*—Jon Henry
*Attorney, Agent, or Firm*—Alston&Bird LLP

[57] ABSTRACT

A panoramic display system for use in a vehicle equipped with a plurality of episcopes (22) includes an information gathering sensor and a plurality of displays (24) for the gathered information. Each display (24) is associated with a respective episcope (22) and is operable to display the information gathered from a field of view corresponding to the respective episcope.

19 Claims, 3 Drawing Sheets

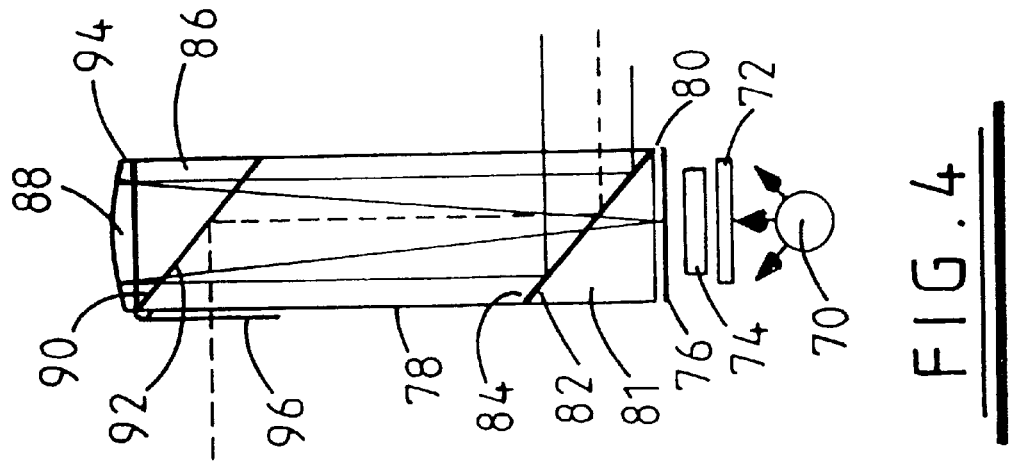
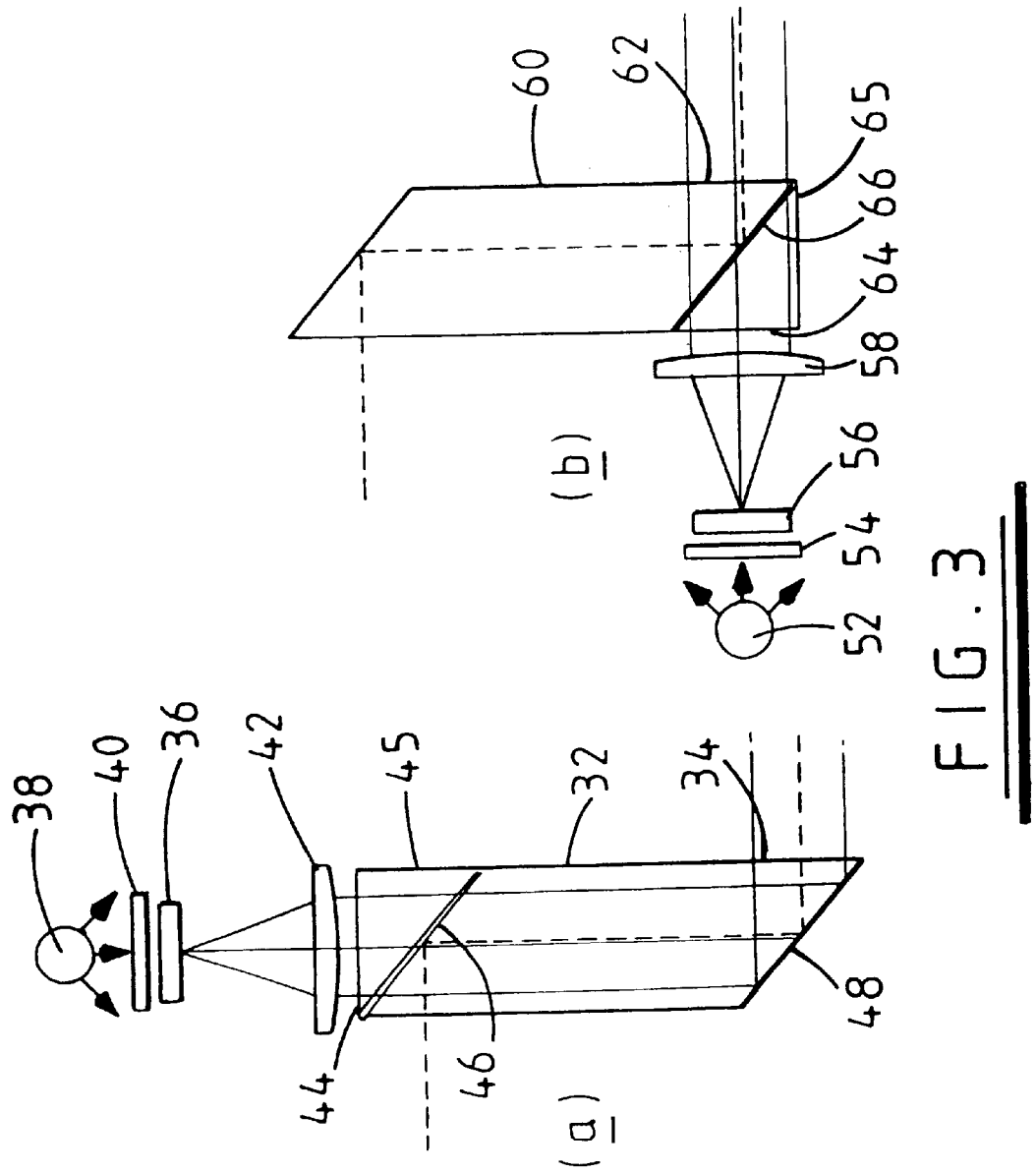

DISPLAY SYSTEM

This invention relates to a display system, and in particular but not exclusively to a panoramic display system.

There is a common requirement in military vehicles for panoramic vision, to assist the vehicle crew in surveillance and target acquisition, situational awareness and vehicle control. In daylight conditions this may be provided by windows. To reduce the vulnerability of the vehicle due to penetration of the windows by shrapnel or small-arms fire it is common to provide the windows with "episcopes" which comprise glass rhomboid blocks which act as unity-magnification periscopes. The episcopes may be arranged in a ring with their viewing apertures aligned to provide a panoramic field of view. During night operation, or in the presence of smoke or intense light sources, the utility of these episcopes is limited and their use may even present a hazard. It is thus necessary to provide some other form of panoramic sensor, such as a thermal imaging system. Advances in such sensors now allow information to be gathered over 360° with resolution comparable to that of the eye, but there is considerable difficulty in displaying such information in an easily assimilated form within the confines of a typical armoured fighting vehicle (AFV). Displays of moderate size have inadequate resolution to provide a panoramic display, such that an operator will typically have to select a limited field of view for display on a single relatively small screen. In this situation it is generally not possible to locate the position of a threat within the 360° arc with the same rapidity as is possible with the direct-view episcopes.

It is among the objects of the embodiments of the present invention to provide a indirect viewing system which obviates and mitigates these disadvantages.

According to the present invention there is provided a panoramic display system for use in a vehicle equipped with a plurality of episcopes, including an information gathering sensor and a plurality of displays for the gathered information, each display being associated with a respective episcope and being operable to display the information gathered from a field of view corresponding to the respective episcope.

In use, the operator may utilise the episcopes in the normal manner while conditions permit. However, in poor visibility the sensor and displays may be utilised to provide indirect viewing of the same or a similar scene. Operators will thus only require minimal retraining to acquire an indirect viewing capability comparable with the existing direct view capability, as the display will closely mimic the views obtained from the episcopes.

As used herein, the term episcopes is intended to encompass conventional episcopes as described above, as well as periscopes and other direct viewing arrangements in which a reflected or redirected image is viewed.

Preferably, the gathered information is provided with substantially unit magnification, to correspond with the unit magnification provided by a typical episcope. The facility to increase magnification selectively may be provided to permit an operator to zoom in on a particular scene.

The indirect displays may be viewed in conjunction with the respective episcopes, or may be arranged for exclusive viewing. The indirect display may be provided adjacent the episcope aperture, or may be overlaid on the directly viewed scene. Conveniently, the latter arrangement is achieved by injecting the indirectly viewed scene into the visual path of the respective episcope such that it appears at the episcope aperture.

Preferably also, each display is collimated, to allow relaxed viewing. The display and associated collimator may be separate from the episcope, but savings in space may be achieved by integrating one or both of the collimator and display with the episcope. The collimating optics may introduce residual distortions which may be compensated by distorting the electronic image sent to the display.

The displays may be moveable to cover the episcope apertures, or the episcopes may be provided with shutters or spectral filters, such that stray light from the vehicle interior or the indirect display is not visible outside the vehicle through the episcopes.

One or more information gathering sensors may be provided and may be in the form of one or more of, for example, thermal imaging sensors, radar, or low light TV.

The displays may be electronic displays in the form of a transmissive liquid crystal or electro-chromic device with an illuminating light source, or may be self-luminous, such as a CRT or electro-luminescent display.

This and other aspects of the present invention will now be described, by way of example, with reference to the accompanying drawings, in which:

FIGS. 3a and 3b are somewhat schematic views of an episcope for use in an AFV, in which an indirect display is collimated and injected into the vision path of the episcope;

FIG. 4 is a somewhat schematic view of an episcope in which the indirect display is injected into the visual part of the episcope and the collimator is integrated with the episcope.

Figure 1:
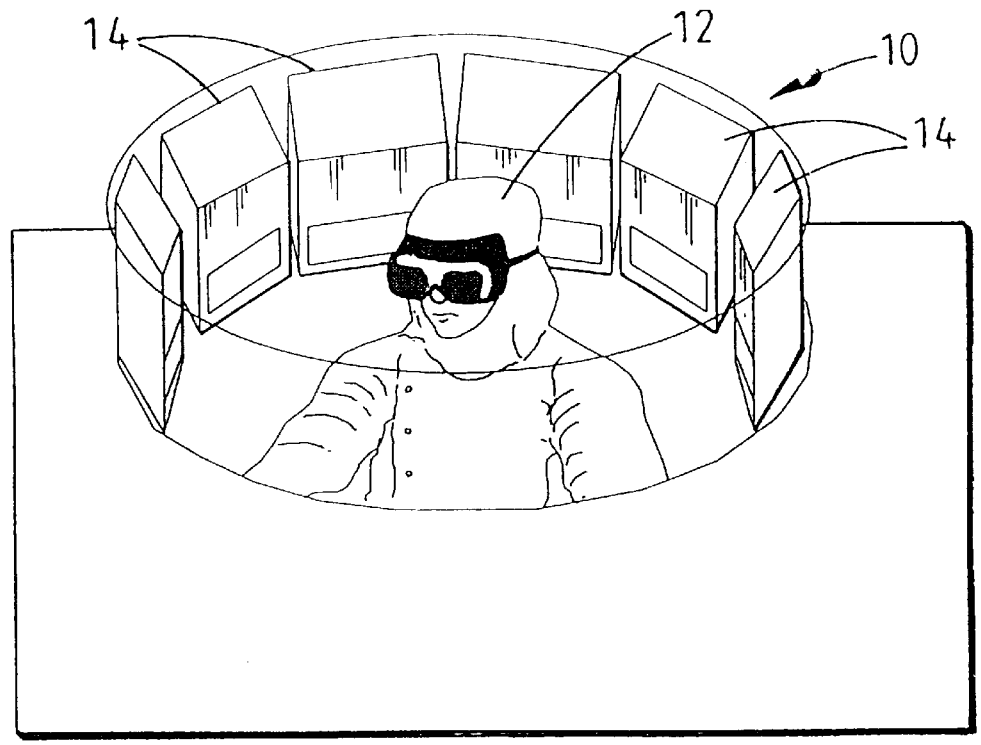
FIG. 1 is a somewhat schematic representation of part of an armoured fighting vehicle (AFV) provided with a series of episcopes, to provide panoramic vision, in accordance with the prior art.

Reference is first made to FIG. 1 of the drawings, which is a somewhat schematic illustration of a tank turret 10. In order to provide the operator 12 with a panoramic view, a series of windows are provided around the circumference of the turret 10, and to reduce the vulnerability of the vehicle due to penetration of the windows by shrapnel or small arms fire each window is provided with an episcope 14 comprising a glass rhomboid block which acts as a unity magnification periscope. Such rhomboid blocks are frequently split to give an internal air gap to prevent transmission of mechanical shock, but this refinement is not illustrated in the figure. In normal daylight conditions, the episcopes 14 provide the operator 12 with a 360° direct view capability. The displays are integrated with cueing devices to assist in alerting the vehicle crew to an arc in which a possible threat has been detected. However, in restricted visibility, the operator 12 must rely upon indirect viewing systems utilising, for example, one or more of thermal imaging sensors, radar or low light TV. Conventionally, the indirect images obtained from these sensors, which may gather information over a 360° field of view, is displayed on a single screen, the operator determining the particular field of view to be displayed on the screen. Accordingly, it is difficult for the operator to locate the position of a threat within the 360° arc with the same rapidity as is possible using the direct view episcopes 14.

Figure 2:
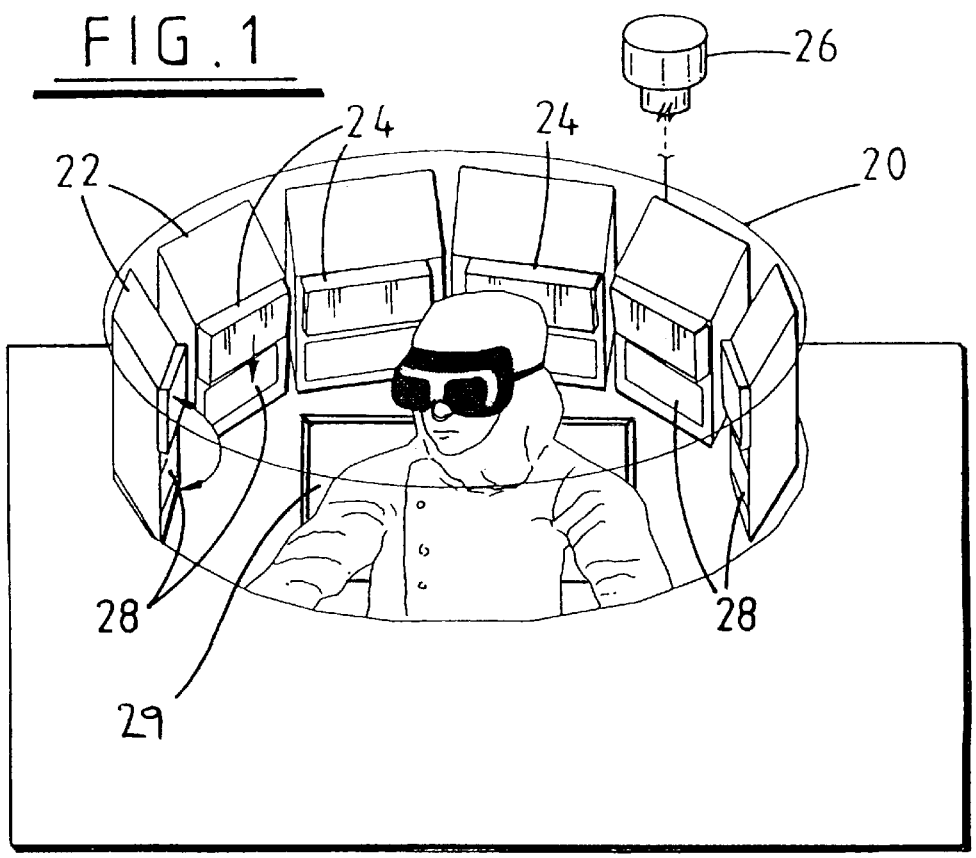
FIG. 2 is a similar view to FIG. 1, in which the episcopes are provided with indirect displays, in accordance with a first embodiment of the present invention.

Reference is now made to FIG. 2 of the drawings, which illustrates a tank turret 20 equipped with a display system in accordance with a first embodiment of the present invention. In a similar manner to the conventional turret 10 described above, a plurality of episcopes 22 are provided in a ring to provide the operator 12 with a panoramic direct view capability. However, additional flat panel LCD displays 24 are mounted on the inner faces of the episcopes 24. The displays 24 are linked to a thermal imaging sensor 26 which gathers information over 360°. The image appearing on each display 24 corresponds to the direct view obtained from the aperture 28 of the respective episcope 22 on which the display is mounted. For direct compatibility with the direct view screen, the indirect image is displayed with substantially unit magnification. Also provided is a single, large monitor 29 (shown behind the operator), central and convenient to the operator; the detail shown on the panoramic indirect displays may be insufficient to permit proper target identification recognition and weapon cueing. The smaller indirect displays 24 thus incorporate a control, operated by the operator by touch or other means, to display selected information from one of the smaller displays on the central monitor 29.

In darkness, it is frequently important that stray light from the interior of the vehicle should not be visible from outside the ring of episcopes 22. This may be ensured by arranging the displays 24 such that they may cover the episcope apertures 24 when the episcopes 22 are not in use.

Reference is now made to FIG. 3a of the drawings, which illustrates a single episcope 32 in which the indirectly viewed screen is injected into the visual path of the episcope such that the image appears at the episcope aperture 34. In this example, the display 36 is in the form of a transmissive liquid crystal with an illuminating light source in the form of a lamp 38. A diffuser 40 is provided between the lamp 38 and the display 36, and the projected image from the display 36 is passed through a collimator 42, to allow relaxed viewing.

The display 36 is provided above the upper end of the episcope 32, which in this arrangement is provided with a plane upper face 44 defined by a prism 45. The episcope 32 is provided with a 45° beam splitter 46 for reflecting the direct view image. Both the direct and indirect images are reflected from the lower rhomboid episcope face 48 and are visible at the episcope aperture 34.

FIG. 3b of the drawings illustrate an arrangement in which a lamp 52, diffuser 54, display 56, and collimator 58 are provided towards the lower end of an episcope 60, directly behind the aperture 62. Accordingly, the lower portion of the episcope is provided with a plane rear face 64 defined by a prism 65, and the beam splitter 66 is provided to reflect the incoming direct image.

Rather than providing a separate collimator as illustrated in the embodiments of FIGS. 3a and 3b, it is possible to integrate the collimator with the episcope, as illustrated in FIG. 4 of the drawings. In this embodiment a lamp 70 (or spectrally narrow source such as a visible laser LED), diffuser 72, LCD display 74 and narrow band filter 76 are provided below the lower end of the episcope 78. The lower rhomboid episcope face 80 is plane, defined by a prism 81, and the indirect image is transmitted through a beam splitting coating 82 on the lower rhomboid episcope surface 84, which coating is partially transmissive, partially reflective in the spectral region of the display 74, and is reflective over the remainder of the visual wave band. The upper end of the episcope 78 is provided with a 45° prism 86 provided with a concave reflecting surface 88. The upper rhomboid episcope surface 90 is provided with a beam splitter 92 which is transmissive in the spectral region of the display and reflective over the remainder of the visual wave band. In the illustrated embodiment the beam splitting coating 82 is polarising, and in this situation the concave reflecting surface 88 is provided on a quarter wave plate 94. If the beam splitting coating 82 is not polarising the prism 86 and plate 94 may be provided as a single component. The brightness of the displayed image and the view of the outside world can both be maximised by using a narrow band light source (laser, LED or narrowband CRT phosphor) and holographic elements to act as the various beamsplitters and collimating mirrors.

To prevent stray light being visible from outside the vehicle, the portion of the episcope 78 which is visible from exterior of the vehicle is provided with a spectral blocking filter 96.

Figure 5:
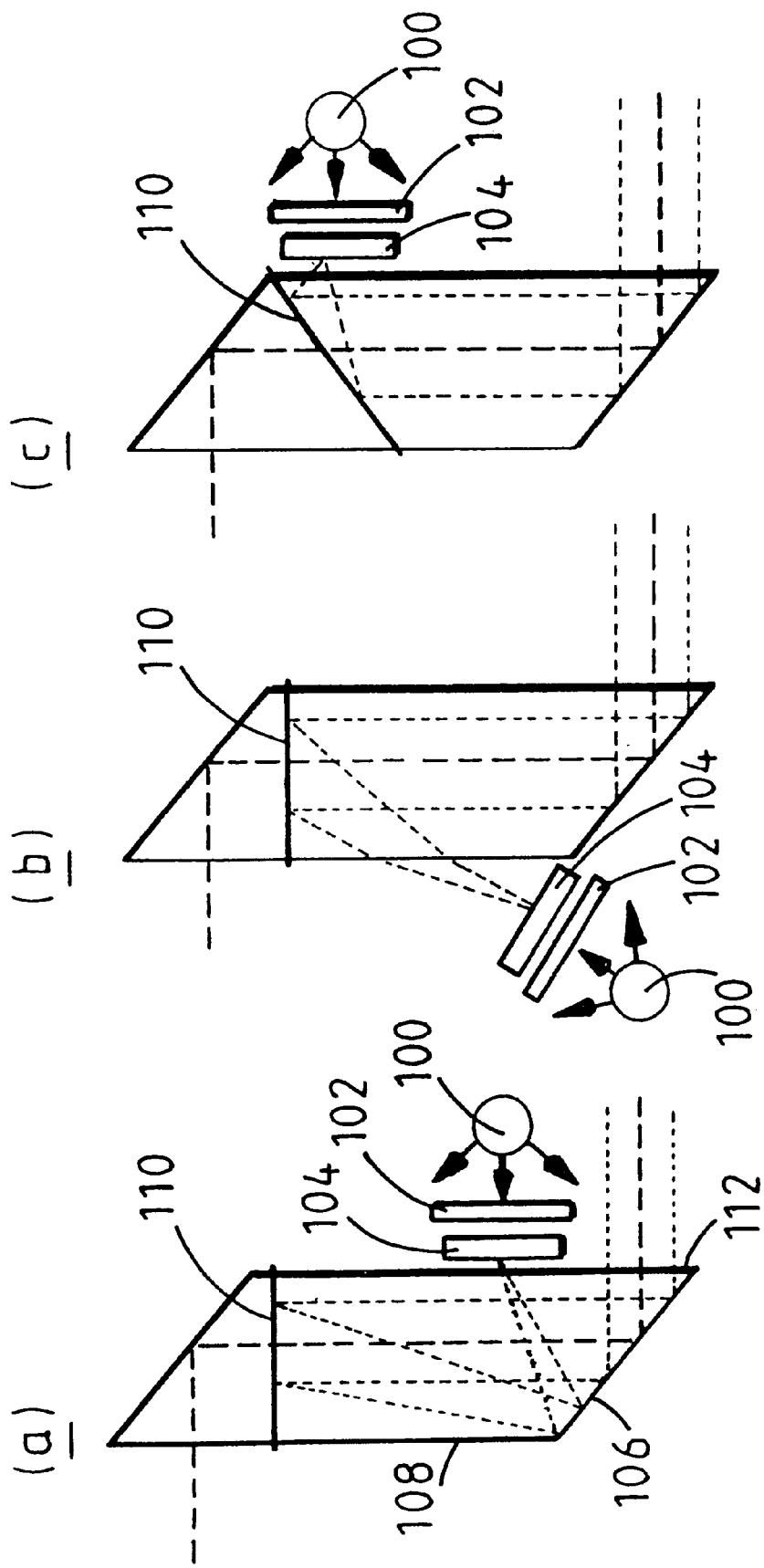
FIGS. 5a, 5b and 5c are somewhat schematic views of further alternative arrangements for injecting an indirect image into an episcope.

In further embodiments of the present invention, it is possible to form the collimator using a holographic optical element, and embodiments incorporating this feature are illustrated in FIGS. 5a, b and c of the accompanying drawings. Reference is first made to FIG. 5a, which illustrates a lamp narrowband light source 100 such as a laser or monochromatic LED, diffuser 102 and display 104. The image from the display 104 is reflected from the lower rhomboid surface 106 of the episcope 108 and then reflected by a collimating powered non conformal hologram 110 provided towards the upper end of the episcope 108 and extending normal to the main rhomboid axis. The collimated images are then reflected from the lower rhomboid surface 106 and projected through the episcope aperture 112.

FIGS. 5b and 5c illustrate other configurations in which the lamp 100, diffuser 102 and display 104 are in different positions relative to the episcope 108 and in which the hologram 110 is differently oriented (FIG. 5c). It is also possible to form the holographic optical element on one of the existing plane surfaces of the episcope.

It will be clear to those of skill in the art that the above-described embodiments are merely exemplary of the many system configurations possible within the scope of the present invention. It will also be evident to those of skill in the art that the above-described embodiments may be subjected to modifications and improvements, within the scope of the present invention.

We claim:

1. A panoramic display system for use in a vehicle equipped with a plurality of episcopes, the system including an information gathering sensor for gathering information and a plurality of displays for gathered information, each display for association with a respective episcope and being operable to display information gathered from a field of view corresponding to the respective episcope, further including a larger central display device for displaying selected information from one of said plurality of displays.

2. The system of claim 1, wherein the plurality of displays display information with substantially unit magnification.

3. The system of claim 1, wherein each display is provided with one of a shutter and a spectral filter to prevent emission of stray light through an associated episcope.

4. The system of claim 1, wherein each display is collimated, to allow relaxed viewing.

5. The system of claim 1, wherein each episcope defines a visual path and each display is arranged to inject an image therefrom into the respective episcope visual path.

6. The system of claim 1, wherein each display is provided adjacent a respective episcope aperture and is movable to cover the aperture when a respective episcope is not in use to prevent emission of stray light through the episcope.

7. The system of claim 1, wherein each display is a transmissive liquid crystal with an illuminating light source.

8. The system of claim 1, wherein each display is an electro-chromic device with an illuminating light source.

9. The display of claim 1, wherein each display is self-luminous.

10. The display of claim 1, wherein each display includes a collimator in the form of a holographic optical element.

11. The display of claim 10, in combination with a plurality of episcopes wherein each said holographic element is formed on a plane surface of a respective episcope.

12. The system of claim 1, in combination with a plurality of episcopes.

13. A panoramic display system for use in a vehicle equipped with a plurality of episcopes, the system including an information gathering sensor and a plurality of displays for gathered information, each display for association with a respective episcope and being operable to display information gathered from a field of view corresponding to a respective episcope, and a central display device for displaying selected and magnified information from one of said plurality of displays.

14. A panoramic display system for use in a vehicle equipped with a plurality of episcopes, the system including an information gathering sensor for gathering information and a plurality of displays for gathered information, each display for association with a respective episcope and being operable to display information gathered from a field of view corresponding to the respective episcope, wherein each episcope defines a visual path and each display is arranged to inject an image therefrom into the respective episcope visual path, in combination with a plurality of episcopes wherein each display output is substantially collimated and is injected into a respective episcope visual path by a beam splitter at an upper rhomboid face of a respective episcope.

15. A panoramic display system in combination with a plurality of episcopes each defining a visual path, the system for use in a vehicle and including an information gathering sensor for gathering information and a plurality of displays for gathered information, each display for association with a respective episcope and being operable to display information gathered from a field of view corresponding to the respective episcope by injecting an image from the display into the respective episcope visual path wherein each display emits within a defined spectral region narrower than the visual spectrum and each display includes a collimator comprising a concave surface on a 45 degrees prism separated from an upper rhomboid surface of a respective episcope by a beam-splitter which is transmissive in the spectral region of the display and reflective over the remainder of the visual waveband, the display being injected through a lower rhomboid surface of the episcope by a beam-splitting coating which is partially transmissive, partially reflective in the spectral region of the display and is reflective over the remainder of the visual waveband.

16. The system of claim 15, wherein the beam-splitting coating of the lower rhomboid surface of each episcope is substantially polarizing in the spectral region of the respective display and a quarter-wave plate is inserted between the upper rhomboid surface and the concave colligating surface so that radiation which passes through said coating from the display is reflected at said coating after reflection of the colligating surface.

17. A panoramic display system for use in a vehicle equipped with a plurality of episcopes, the system including an information gathering sensor for gathering information and a plurality of displays for gathered information, each display for association with a respective episcope and being operable to display information gathered from a field of view corresponding to the respective episcope wherein each display includes collimating optics and means are provided for compensating residual distortions of said optics by distorting an electronic image sent to each display.

18. A panoramic display system for use in a vehicle, the system comprising a plurality of episcopes, an information gathering sensor for gathering information and a plurality of displays for gathered information, each display being associated with a respective episcope and being operable to display information gathered from a field of view corresponding to the respective episcope, further including a larger central display device for displaying selected information from one of said plurality of displays.

19. A panoramic display system for use in a vehicle, the system comprising a plurality of episcopes, an information gathering sensor, a plurality of displays for gathered information, each display being associated with a respective episcope and being operable to display information gathered from a field of view corresponding to the respective episcope, and a central display device for displaying selected and magnified information from one of said plurality of displays.

* * * * *